United States Patent Office 3,421,535
Patented Jan. 14, 1969

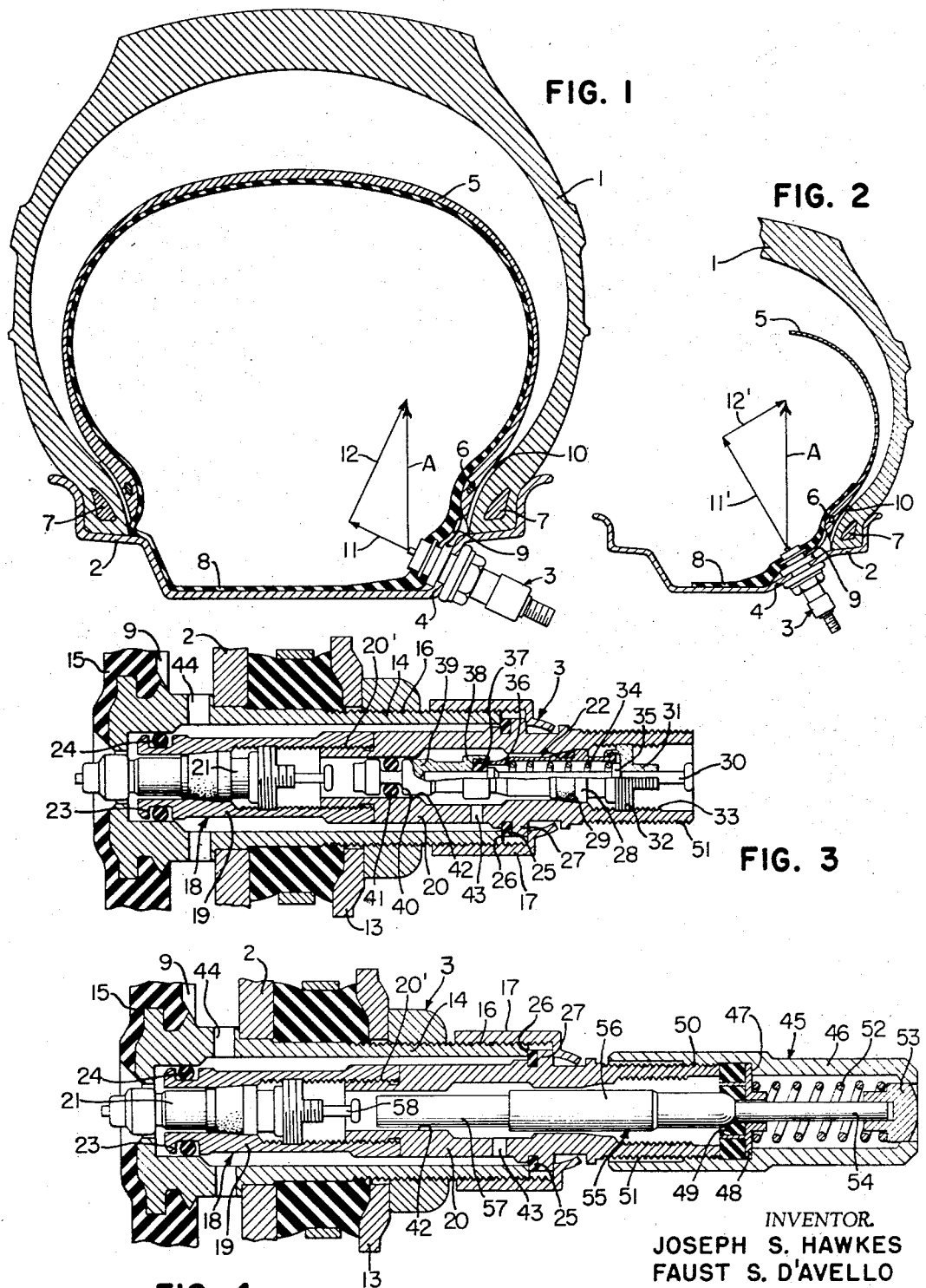

3,421,535
VALVE MECHANISM
Joseph S. Hawkes, Cuyahoga Falls, and Faust S. D'Avello, Akron, Ohio, assignors to The Goodyear Tire & Rubber Company, Akron, Ohio, a corporation of Ohio
Filed May 9, 1966, Ser. No. 548,763
U.S. Cl. 137—234.5       7 Claims
Int. Cl. F16k *15/20;* B60c *17/04*

This invention relates to a valve mechanism for inflating both chambers of a duel chambered safety tire and particularly such tires used on high speed vehicles such as racing cars. Such tires usually comprise inner and outer chambers with the inner chamber being preferably inflated to a higher pressure than the outer chamber to insure that the beads of the tires are firmly engaged at all times to hold the inner tire against relative motion with respect to the outer tire and to insure the outer tire beads will be held firmly in operative position on the rim at all times. In the event the outer chamber deflates it is imperative for the safety of the driver that all or substantially all of the air remain in the inner chamber to enable the driver to control the vehicle and continue to a service area for repairs. In the case of a race car, it is important that the driver be able to continue driving for a considerable distance at relatively high speeds to reach the service pit.

Some valve mechanisms of this general type consist of a valve stem having a first port for supplying air to the inner chamber from the stem. A first valve arranged at the inner end of the stem controls the air flow through the port and remains normally closed after inflation. A second port is provided in the stem through which air may flow freely from the stem into the outer chamber when air is admitted to the stem through a second valve at the outer end of the stem. Both chambers are generally simultaneously inflated utilizing the air pressure to open the valve to the inner chamber while air flows freely to the outer chamber through the second port. Sometimes mechanical means is employed during inflation to open the inner valve during inflation or for a pressure check of the pressure in the inner chamber. In either case, however, if for any reason said first valve opens or becomes defective so as to cause leakage of air from the inner chamber, air will leak out of the inner chamber into the stem and into the outer chamber which is at a lower pressure and this leakage will eventually cause equalization of the pressures in the chambers and, in the case where the outer chamber fails, the inner chamber also deflates because of such leakage, thus destroying the value of the inner safety chamber.

It is important that the inner chamber be maintained at a higher pressure than outer chamber in order to counteract the effect of centrifugal force acting on the inner tube. As will appear later in the description, in order to get air into the outer chamber, an air passage is provided between the walls of the chamber to provide a passage for air to reach the outer chamber from the second port. This passage also communicates with the well of the drop center rim and if the pressures in the two chambers are equal, the centrifugal force acting on the tube would compress the air therein and move the rim contacting part of the inner tube radially and air from the outer chamber would be drawn into the space vacated by the inner tube. If the centrifugal force is high enough to move the inner portion of the tube radially beyond the beads of the inner tire, the pressure between the two tires may be relieved to such an extent that the tires would probably be free to move relative to each other in a circumferential and/or a radial direction. The tube and inner tire could also move axially with the result that an undesirable vibration would occur. This condition will not permit safe driving of the vehicle at high speeds. For these reasons, it is necessary to maintain the inner chamber pressure higher than that of the outer chamber to hold the inner tire in proper operative position.

At normal speeds used in highway traffic the spring means will generally hold both valves closed but at high speeds such as are encountered in racing, centrifugal force may cause opening of either or both valves permitting equalization of the pressures and a failure of the inner chamber when the outer chamber fails.

The present invention has for its object the provision of a valve of this type in which, after inflation of both chambers, means is provided for positively cutting off communication between both ports so that if the valve to the inner chamber fails to remain closed or leaks there can be no loss of air from this chamber and in the case of an outer chamber failure, the air in the inner chamber will enable the driver to maintain control of the car. A valve cap on the stem prevents loss of air to the atmosphere if the outer valve opens.

More particularly, this means for cutting off communication between the two chambers comprises means carried by the outer valve operating against a tubular wall of the stem and this is arranged between said ports to seal off communication between them.

In the drawing:

FIG. 1 represents a transverse cross-section through a safety tire mounted on a rim, this rim being of the type generally found on passenger vehicles and on some racing cars.

FIG. 2 is a similar cross-section showing a rim of a different type which is found on many racing cars.

FIG. 3 is a longitudinal cross-section through the valve mechanism and a portion of the rim shown in FIG. 1 showing the parts in the position that they occupy after inflation, and FIG. 4 is a similar cross-section of the valve mechanism provided with an adaptor mounted on the stem.

In FIGS. 1 and 2, the tire 1 is shown mounted on the rim 2 and the valve mechanism 3 is mounted in a rim hole provided in an angularly arranged portion 4 of the rim. An inner tire 5 is arranged as shown and this is provided with beads 6 at the inner edges to restrain the radial movement of the inner tire under centrifugal force. These beads are adapted to lie against the adjacent beads 7 on the outer tire. An inner tube 8 is arranged within the inner tire. This is preferably separate from the inner tire but may be integral therewith. The base of the valve mechanism 3 is attached to this inner tube with one port of the stem communicating with the inner chamber and the other port communicating with the outer chamber through grooves 9 in the base of the valve and grooves 10 in the outer surface of the inner tire. Means is provided for clamping the valve in place and while a mechanical means is shown for this purpose the valve could be provided with a rubber outer body as on a "snap-in" valve to permit the valve stem to be snapped into place on the rim to seal and maintain the valve stem in the rim hole and thus prevent leakage of air from the outer chamber.

In FIGS. 1 and 2, the centrifugal force acting on the valve is indicated by the vector A and in FIG. 1 the component of this centrifugal force acting on the valve to open it against the action of the air pressure in the inner chamber and the valve spring is represented by the vector 11, the other component being indicated by the vector 12. In FIG. 2 the corresponding vectors are 11' and 12'. In FIG. 2 where the angular portion 4 of the rim is at a greater angle to the direction of vector A, the component 11' is considerably greater than component 11 in FIG. 1. If the valve mechanism were placed in the base of a flat base rim the axis of the valve would be radial and all of the centrifugal force represented by the vector A would act in a direction to open the valve. It is obvious from an inspection of FIGS. 1 and 2 that the component of the centrifugal force represented by the vectors 11 or 11' increases and decreases as the angle of the portion 4 of the rim, with respect to vector A, increases and decreases. This same force acts on the outer valve but if it opens, a cap on the stem would prevent air loss.

FIG. 3 shows a cross-section of the valve mechanism and no description will be made of the particular clamping means 13 which holds the valve stem in sealed relation in the rim hole 1 as this is not important except to point out that it is designed to seal the stem in the rim hole. The valve stem 14 attached to the base 15 is threaded externally at 16 to receive the internally threaded nut 17. Arranged within the stem is a tubular housing or wall 18 forming a tubular passage for the air entering the valve mechanism consisting of an inner tubular portion 19 and an outer tubular portion 20. These are united by mutually interengaging threads 20' to which a sealant is first applied to prevent the escape of air through the joint during use and to hold the two parts united. The purpose in initially making the housing in two parts is to permit the insertion of the inner valve core 21 in the inner part 19 of the housing before assembling the two parts. An outer valve core 22 is provided in housing 18 at the outer end thereof to admit air to the housing and to check the pressure in the outer chamber. The inner end of the housing 18 is provided with a recess 23 which retains an O-ring 24 to seal the space between the housing and stem. The outer end of the housing 14 could be similarly sealed to the stem but as shown employs a flat washer 25 which is forced down against the outer end 26 of the stem when the nut 17, acting against a flange 27, compresses the rubber between the flange 27 and the outer end of the stem 26 to hold the housing in place. A cap (not shown) is applied to the outer end of the housing 18 to prevent air leaving the housing should the outer valve open. Although less desirable, the housing could be an integral part of the stem.

The valve core 22 comprises a barrel 28 suitably sealed by a rubber washer 29 to the wall of the housing 18 in the usual manner and a pin 30 passes through the barrel and through a swivel 31 threaded at 32 on the threads 33 on the inner wall of the housing. This is the usual valve core construction. A spring 34 arranged within the barrel operates against a flange 35 on the pin 30 and a shoulder 36 at the inner end of the barrel. The pin at its inner end is provided with a rubber sealing element 37 arranged in a cup-shaped portion 38 of an extension 39 on the pin. This extension has a recess for receiving the end of the pin and is crimped to the pin to hold it in place. At the inner end of the extension 39 is a recess 40 receiving an O-ring 41 which seals against the inner reduced cylindrical portion 42 of the inner wall of the housing.

When the pin 30 is depressed for inflation purposes the pin moves the cup-shaped portion 38 to open the passage through the barrel 28 to admit air to the housing. However, the O-ring 41 prevents any air from passing through the housing to the inner valve 21 which is constructed similarly to the outer valve except that it does not have an extension thereon such as 39. However, air may pass from the housing through the metering port 43 into the space between the housing and stem and out through the ports 44 to the outer chamber through the grooves 9 and 10. Thus in checking the pressure in the outer chamber no air is released from the inner chamber and when it is desired to replace the air in the outer chamber, if the pressure drops, it is only necessary to attach the air line to the valve in the usual manner for this purpose.

In order to inflate the inner chamber it is necessary to remove the outer valve 22 from the housing as shown in FIG. 4 to permit air to flow through the housing and the inner valve core 21 to the inner chamber. A valve adaptor 45 is then attached to the stem as shown in FIG. 4. This comprises a tubular portion 46 having a shoulder 47 against which a metal washer 48, carrying a washer 49, of rubber or other suitable material for sealing purposes, abuts. It will be noted that the threaded portion 50 on the adaptor which engages the threaded portion 51 on the housing, projects radially inward beyond the outer dimension of the washer 49 so that the end of the threaded portion engages the washer 49 to maintain that washer and the washer 48 in position. A spring 52 arrangend within the adaptor abuts the washer 48 and the inner surface of a head 53 crimped on the pin 54 to normally urge the parts into the positions shown in FIG. 4. This pin carries an elongated extension 55 provided intermediate its ends with an enlarged portion 56 for strength. There is sufficient clearance around this portion and the housing to allow the air to pass it freely. The inner end 57 is adapted to engage the pin 58 on the inner valve 21 and open that valve when the pin 54 moves to the left as when depressed by the pin on an air chuck or a pressure gauge.

With the valve positioned as shown in FIG. 4 original inflation may be accomplished by mechanically opening the inner valve 21 by the depressing pin 54 and allowing air to pass through the valve to the inner chamber. Air also passes through the metering port 43 and port 44 to the outer chamber. This port 43 is preferably a metering port which determines the amount of air that passes into the outer chamber with respect to the amount of air that passes into the inner chamber through the valve 21. The relative flow is preferably such that the pressure in the inner chamber builds up faster than the pressure in the outer chamber. If, upon checking the pressures in the chambers, it is found there is not a sufficient differential between the pressures in the two chambers this may be adjusted after the valve core 28 is replaced, at which time the seal 42 prevents any air from entering or leaving the inner chamber and the pressure in the outer chamber may be adjusted by adding to or taking air from the outer chamber to establish the desired differential pressure.

While the housing 18 is shown as separable from the stem it may be made integral with the stem but such a construction would not permit removing the housing from the stem for rapid deflation of the outer chamber through the larger port 44. In the claims the term "second port" is used to include one or more ports, the combined areas of which constitute an effective area larger than that of the metering port in which case each port 44 could be smaller than the metering port 43 but their combined areas should be substantially greater than that of the port 43. As shown, two ports 44 are employed.

Although the inner edges of the inner tire as shown do not seat on the rim bead seats it is preferable in racing tires to have them do so and the invention covers the use of an inner tire having the inner edges formed similar to those of the outer tire 1 so they may seat on the rim.

The pressure of the air in the inner chamber should preferably be in the order of 15# to 25# more than that in the outer chamber. For racing tires, the outer chamber pressure should be in the order of 35# to 65# with the inner tire pressure from 60# to 90#. For passenger tires, these latter pressures should be somewhat lower and the differential pressure need not be as great.

Having thus fully described our invention what we claim and desire to secure by Letters Patent of the United States is:

1. Valve mechanism for inflating both chambers of a tire having inner and outer chambers, comprising a valve stem within which is an inflation passage for delivering air to said chambers, a first port in said stem communicating with said inflation passage and the inner chamber of such a tire, a second port in said stem in communication with said passage and with the outer chamber thereof, a first valve mounted in said passage at the inner end thereof which when closed cuts off communication between said port and passage, a normally closed second valve at the outer end of said passage controlling the flow of air into and out of said passage, said second valve having an extension mounted thereon at its inner end provided with sealing means engaging said passage wall in all operable positions of said second valve to cut off communication between said valves and between said chambers even if said valves should open, said second valve being removable with its extention to permit simultaneous inflation of both chambers through said passage.

2. Valve mechanism as set forth in claim 1 in which said passage is in part defined by a tubular wall which is a part of a separate housing releasably mounted in said stem, said valves being mounted on said housing so as to be removable therewith to permit air to escape from said chambers through said stem, said wall having a metering port therethrough forming the communication between said passage and second port.

3. Valve mechanism as set forth in claim 1 in which said second valve is removable therefrom independently of said first valve, said passage being constructed to receive an adapter when the second valve is removed, said adapter being provided with a third valve having an elongated pin which engages and opens said first valve when said third valve is opened to permit air to enter said passage and flow to both ports to inflate both chambers and to permit a check of the inner chamber pressure by a pressure gauge.

4. Valve mechanism as set forth in claim 3 in which said wall has a metering port in communication with said second port and passage which determines by its size the rate of air flow to said outer chamber through said second port from said passage and the relative rates of flow of air through said first and second ports during inflation, which rates are such as to cause a faster build up of pressure in the inner chamber than in the outer chamber.

5. Valve mechanism as set forth in claim 2 in which said second port is of substantial cross-section, greater than the cross-section of said metering port, whereby, when said housing is removed from said stem, air will be discharged from said outer chamber at a rapid rate.

6. Valve mechanism as set forth in claim 2 in which sealing means are arranged in said passage and between adjacent walls of said housing and stem at two longitudinally spaced positions in said passage, said second and metering ports being arranged between said positions.

7. Valve mechanism as set forth in claim 1 in which said sealing means is an O-ring mounted in a retaining groove in the extension with the outer circumference of said O-ring being in for continuous sealing engagement with said wall when said extension is moved.

References Cited

UNITED STATES PATENTS

| | | | |
|---|---|---|---|
| 2,122,740 | 5/1938 | Eckenroth | 137—223 |
| 2,189,485 | 2/1940 | Crowley | 137—223 X |
| 2,549,075 | 4/1951 | Fox | 137—223 |
| 2,749,931 | 6/1956 | Battin | 137—234.5 X |
| 3,361,153 | 1/1968 | Krohn et al. | 137—234.5 |

WILLIAM F. O'DEA, *Primary Examiner.*

DENNIS H. LAMBERT, *Assistant Examiner.*

U.S. Cl. X.R.

152—341